United States Patent [19]

Gray

[11] 3,858,135

[45] Dec. 31, 1974

[54] PUSH-PULL LINEAR MOTOR

[76] Inventor: Samuel A. Gray, P.O. Box 7127, Sun Valley, Calif. 91505

[22] Filed: Nov. 5, 1973

[21] Appl. No.: 412,818

Related U.S. Application Data

[63] Continuation-in-part of Ser. No. 280,405, Aug. 14, 1973, Pat. No. 3,774,642.

[52] U.S. Cl............ 335/266, 251/137, 137/625.65
[51] Int. Cl............................ H02p 5/28, H02p 7/36
[58] Field of Search ....... 137/625.65; 251/137, 129, 251/132, 282; 335/259, 136, 264, 269, 266, 267; 318/123

[56] References Cited

UNITED STATES PATENTS

| | | | |
|---|---|---|---|
| 2,322,911 | 6/1943 | Beam | 251/137 X |
| 2,407,184 | 9/1946 | Sparrow | 251/137 |
| 2,515,029 | 7/1950 | Almond et al. | 251/137 X |
| 2,579,723 | 12/1951 | Best | 251/137 X |
| 3,474,313 | 10/1969 | Lucien | 251/137 X |

Primary Examiner—Martin P. Schwadron
Assistant Examiner—Robert J. Miller
Attorney, Agent, or Firm—Georges A. Maxwell

[57] ABSTRACT

A push-pull type linear motor for operating an axially shiftable valve member of a four-way spool-type valve, said motor comprising a pair of oppositely disposed axially convergent conical armatures on a common armature shaft and arranged between a pair of spaced, axially aligned, opposing, energized field coils with complimentary conical pole faces, whereby the armature is magnetically biased at all times and subject to instant response to changes in variations in the flux field of said coils created by differentials in signal currents to said fields; said armatures having shaped magnetically saturable portions related to adjacent related coils whereby magnetic saturation is effected proportionately with respect to linear motion and current differentials; said motor including equal and oppositely disposed spring means at the opposite ends of the armature shaft yieldingly maintaining the armatures in a mean position between the coils.

5 Claims, 6 Drawing Figures

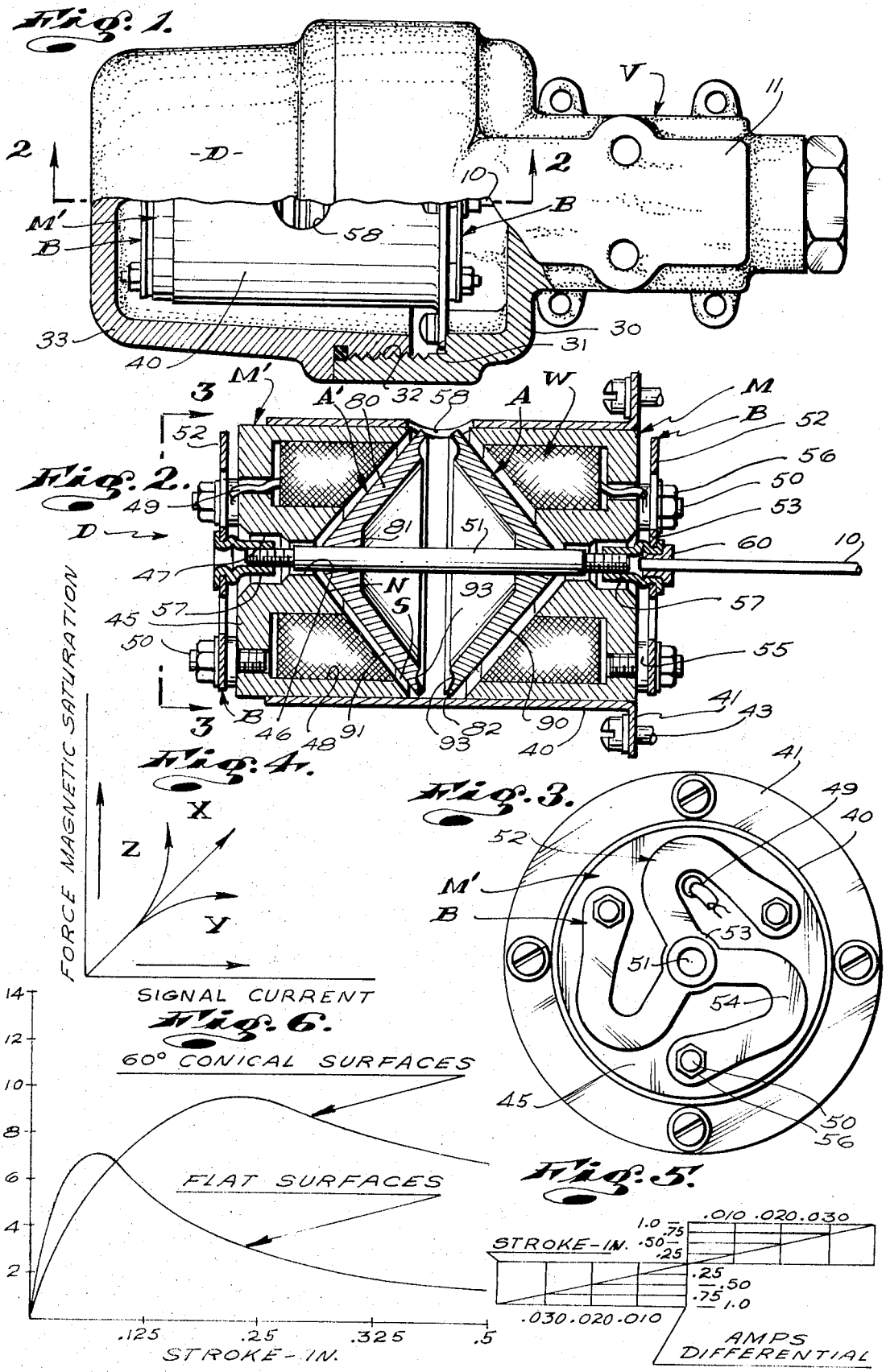

PUSH-PULL LINEAR MOTOR

This is a continuation-in-part of my copending application, Ser. No. 280,405, filed Aug. 14, 1973, entitled "PUSH-PULL LINEAR MOTOR" and issued into U.S. Pat. No. 3,774,642 on Nov. 27, 1973.

This invention has to do with servo-mechanisms and is more particularly concerned with a novel electromagnetically operated fluid valve for use in hydraulic control systems and the like.

Throughout the arts, hydraulic motors, actuators and like devices are widely used to move and/or effect the operation of related mechanical mechanisms and devices and to effect work which is to be performed. The operation of such hydraulic devices is effected by selected and controlled flow of fluid, under pressure, to and from said devices by suitable control valve structures.

While in some instances the control valve means for hydraulic devices can be manually operated, it is often necessary and required that such valve means be capable of being operated or controlled by means separate and oftentimes remote from the valve means. To make possible such operation of control valves, it is common practice to provide the valve structures with electrically operated drive means within closed servo loops. Such means have included solenoids, torque motors, moving coil motors and the like. Such electro mechanically controlled valve structures are commonly referred to and classified as electro-hydraulic servo valves.

The valve structures in most electro-hydraulic servo valves provided by the prior art are costly and complex structures and are such that in order to drive the valving means with those high forces required for accurate and dependable operation, hydraulic amplification is employed. Such amplification requires complicated and delicate structures such as electrical force motors driving flappers relative to nozzle means or such motors deflecting jet pipes relative to receivers.

One of the most common and widely used class of valve structures found in the art of electro-hydraulic servo mechanisms are four-way spool-type valves. Such spool-type valves have an elongate, axially shiftable spool-like valve member arranged in a cylindrical bore in a suitably chambered and ported fluid conducting body, with which the various fluid supply, delivery and return lines are connected.

The electric drive means provided for the last noted class and type of valve is generally a push-pull type of electro mechanical drive means connected or coupled with the valve member.

One form of push-pull type of electro mechanical drive means provided to operate servo control valves of the character referred to above and in combination with suitable amplifying means comprises an elongate armature with one end coupled with the valve member and spring means normally yieldingly holding the armature and the valve member in a central, normal, closed position and a field coil, with a permanent magnet, polarizing core related to and about the armature. The field coil is adapted to receive control signal currents of one polarity or the other whereby a flux field is generated which moves the armature and the valve member axially, against the resistance of the spring means, as desired.

By varying the strength of the signal current, the force of the field is varied and the extent to which the armature and its related valve member is moved by the field against the resistance of the spring means, is varied to effect metering of the fluid flowing therethrough.

While the above form and/or class of push-pull type electro mechanical drive means or motors for servo valve mechanisms appears sound in principle and while they might be adequate and serviceable in some situations, they have been found to be wanting and inadequate where immediate or high response to control signals is required and where great accuracy in metering capability is demanded.

It is a general object and feature of the present invention to provide an electro-hydraulic servo valve means which requires no hydraulic amplification but which falls within that class of such valve means which commonly employ and require the provision and use of hydraulic amplification means.

Another object of this invention is to provide an electro magnetically operated servo valve including a push-pull type linear motor drive means which exerts a high spool valve operating force and having a high natural frequency to variations in the input signal to the motor without the required use or reliance upon hydraulic amplification.

It is a further object of my invention to provide a means or structure of the character referred to wherein movement of the motor armature and resulting movement of a relative valve member is substantially linear with respect to changes in an input signal throughout the full operating range of the means or structure.

It is an object and feature of my invention to provide a push-pull type linear motor for operating an axially shiftable valve member in which a pair of conical armatures fixed to be carried by a common armature shaft, are arranged between a pair of spaced, axially aligned, opposing, energized field coils with complimentary conical pole faces, whereby the armatures are magnetically biased at all times and subject to instant response to changes in variations in the flux fields of said coils and a motor including opposing spring means at the opposite ends of the armature which serve to normally yieldingly urge and maintain the armature in a mean position between the field coils.

It is another object and feature of the present invention to provide a motor of the character referred to having armatures of novel configuration and design whereby portions thereof become magnetically saturated in uninterrupted progression as the armatures move toward one or the other of the field coils in response to increases and decreases in the magnetic fields generated, whereby the force exerted in and through the armatures is substantially linear and the displacement or movement of the armatures is likewise substantially linear.

In the ordinary push-pull type linear motor having flat, radially disposed pole faces on the electromagnet units and flat, radially disposed surfaces on the armatures which oppose the pole faces, the effective linear movement afforded by such arrangement and disposition of parts is limited and oftentimes inadequate for the spool valve or other device desired to be driven thereby.

An object and feature of the instant invention is to provide a motor of the character here referred to wherein the armatures and their related electromagnetic units have complimentary, opposing conical surfaces whereby the effective linear movement afforded by the motor is increased to a substantial extent, thereby materially extending the use and application of the motor.

Yet another object and feature of the instant invention is to adjust the angle of the conical surfaces in the motor whereby the most effective and efficient operation of the motor throughout a given, predetermined linear operating range can be attained.

It is an object and feature of the instant invention to provide a means and structure of the character referred to above which is easy and economical to manufacture, assemble and maintain, a structure and means which is rugged, durable and both highly effective and dependable in operation.

The foregoing and other objects and features of the present invention will be apparent and understood from the following detailed description of a typical preferred form and carrying out of the invention throughout which description reference is made to the accompanying drawings, in which:

FIG. 1 is a top view of my invention with portions broken away and shown in sections to illustrate certain details of the construction;

FIG. 2 is an enlarged detailed sectional view of a portion of the structure shown in FIG. 1 and taken as indicated by line 2—2 on FIG. 1;

FIG. 3 is a detailed view taken as indicated by line 3—3 on FIG. 2;

FIG. 4 is a view of graphic curves illustrating certain operating characteristics;

FIG. 5 is a chart illustrating certain other operating characteristics of my invention; and FIG. 6 is a view of graphic curves illustrating the differential of linear movement of flat and conical related poles and armatures.

Referring to FIG. 1 of the drawings, the servo valve structure provided includes a valve means V and drive means D for operating the valve means V.

The valve means V is a four-way fluid metering spool type or class of valve well known in the art and is the class of valve which commonly includes an elongate, axially shiftable valving member (not shown). The drive means D is a push-pull type electro-magnetic, linear motor structure adjacent to the valve means in axial alignment with the valve member and coupled with said valve member by a suitable operating rod 10.

The valve means V which will be considered and described in a general manner in the disclosure, in addition to the valve member mentioned above and in accordance with common practice includes an elongate body 11 with front and rear ends, a central longitudinal opening with five axially spaced, annular, radially inwardly opening channels and four fluid conducting passages communicating with certain of the channels and opening to the exterior of the body to connect with suitable fluid supply, bypass and delivery lines (not shown). The means V further, and in accordance with common practice, includes a tubular sleeve in the opening in the body, closing the inner opening sides of the channels and having axially and circumferentially spaced, radial ports communicating with the channels and the interior of the sleeve. The valve member is cylindrical and is slidably engaged in the sleeve.

The valve member is provided with three radially outwardly opening annular grooves which serve to establish and close communication between the ports communicating between the interior of the sleeve and adjacent channels, upon axial shifting of the valve member in the sleeve.

The valve structure is such that upon shifting the valve member forwardly from a normal, intermediate closed position, to the right in FIG. 1 of the drawings, fluid is conducted through the valve to a related hydraulic device and fluid from the device is free to flow back into and through the valve. Upon shifting of the valve member rearwardly from its normal or closed position, a reversed flow pattern from that which is described above is effected.

It is to be noted and it is important to understand that metering and controlling the volume of fluid conducted to and from the device with which the valve means is related is effected by controlling the extent of axial movement of the valve member and the extent to which the ports communicating with the referred to channels are opened.

The above valve structure is illustrated and described in greater detail in my U.S. Pat. No. 3,774,642, issued Nov. 27, 1973. The valve means V can be any typical four-way fluid metering spool type valve of the general character referred to above and which are well known to those skilled in the art.

In the case illustrated, the front end of the body 11 is closed by a cap 12 engaged in an opening in that end of the body and so that free access to the interior of the body can be readily had.

In the form of the invention illustrated, the valve member is operatively connected with the operating rod 10 which extends forwardly from the drive means D. The front end of the rod is coupled with the valve member in axial driving relationship by means of a suitable adjustable coupling menas (not shown). The coupling means is accessible at the front end of the body and is so arranged that coupling of the member and rod and axial adjustment thereof can be easily made. The body can, as shown, be provided with suitable mounting means, such as apertured flanges through which mounting screw fasteners can be engaged.

The rear end of the body 11 is provided with an enlarged, rearwardly opening bell-shaped housing portion 30 with an annular, rearwardly disposed mounting shoulder 31 to accommodate a portion of the means D and in which the means D is secured or mounted. The rear end of the housing portion 30 is internally threaded as at 32 and the forward end of an elongate, forwardly opening cup-like closure 33 is engaged therein. The closure 33 freely surrounds and protects that portion of the means D which projects rearwardly from the portion 30 of the body 11, as clearly illustrated in the drawings.

The drive means D, as noted above, is a push-pull type electro-magnetic, linear motor structure.

The means D, while particularly designed and constructed for operating the type or class of valve means V here described in the preceding, or a valve means of similar nature, it is such that it can be advantageously used or employed in many other situations and to operate other means or devices where push-pull type prime movers or drive means are required.

In the form of the invention illustrated, the means D includes an elongate, cylindrical, tubular support barrel 40 with front and rear open ends and having a radially outwardly projecting mounting flange 41 at its front end. The flange 41 engages and stops against the shoulder 31 in the bell portion 30 of the body 11 and is secured thereto by fasteners 43.

The barrel 40 supports and carries a pair of like, oppositely disposed electro magnet units, there being a front unit M and a rear unit M'.

Each of the units M and M' include an elongate cylindrical core 45 in fixed position in an end portion of the barrel and having an outer end disposed axially outwardly from its related end portion of the barrel and a flat, radially, axially inwardly disposed conical inner end. Each core is further characterized by a central longitudinal bore 46 with an enlarged socket 47 opening at its outer end and an annular, axially inwardly opening coil recess 48 entering the inner end and defining inner and outer annular pole faces N and S at said inner end of the core.

The coil recess in each core has cylindrical inner and outer walls and a flat bottom and cooperatively receives and holds a field winding W.

Suitable openings are provided in the outer end of each core to accommodate the leads or conductors for the winding W, as illustrated at 49.

In addition to the above, each core 45 is provided with a plurality (3) of circumferentially spaced threaded studs 50 projecting axially outwardly from the outer end of the core. The studs 50 are shown threadedly engaged in suitable openings provided in the core.

It is important to note that the wall thickness of the core occurring radially outward of the recess 48 is less than the wall thickness of the core occurring radially inward of the recess 48 whereby the crosssectional areas of the core, radially inward and outward of the recess are proportional so that the effective surface areas of the pole faces N and S are equal.

The structure provided next includes an elongate armature shaft 51, of non-magnetic material, extending longitudinally and freely through the bores 46 in the cores of the units M and M' and bridging the space between said units.

The ends of the shaft 51 terminate in the socket openings 47 in the outer ends of the cores 45 and are threaded.

The shaft 51 carries a pair of armatures A and A' intermediate its ends, which armatures are radially and axially outwardly convergent cone-shaped parts and project radially, axially and freely from the shaft in spaced relationship with each other and between the pole faces N and S of the units M and M' with which they are related.

The special form and nature of the armatures will be fully described and considered later in this disclosure.

The structure next includes axially shiftable support means B to support and maintain the shaft 51 and the armatures A and A' concentric in and with the units M and M'.

The means B includes two, like, support springs 52 coupled with the opposite ends of the shaft 51 and with the outer end of the units M and M' related thereto.

The springs 52 have central hub portion 53 and a plurality (3) of circumferentially spaced, radially outwardly projecting, substantially U-shaped spring arms 54 with apertured terminal ends engaged on and about the studs 50 of their related units M and M' as clearly illustrated in FIGS. 2 and 3 of the drawings. The springs 52 are spaced from the cores of their related units M and M' by washers 55 and are secured in fixed relationship by holding units 56 on the studs outward of the springs.

The hub portions 53 of the springs 52 are provided with tubular axial tubes 57 which project axially inwardly into the sockets 47 in the cores 45 of the units M and M' and which threadedly receive and couple with the ends of the shaft 51 related thereto.

The threaded connections between the springs 52 and ends of the shaft 51 permit for axial shifting and adjusting of the shaft and the armatures A and A' thereon. Such axial adjustment can be effected by engaging and rotating the armatures through an access opening 58 provided in the central portion of the sleeve 40, as shown in FIG. 1 and FIG. 2 of the drawings.

The springs 52 are flat, normally radially extending parts and are normally unbiased. When in their normal position, the central radial plane of the space between armatures A and A' on the shaft 51 is midway between the opposing pole faces of the units M and M' and the opposing, radially and axially outwardly disposed conical surfaces of the armatures A the units M and M' and the opposing, radially and axially outwardly disposed conical surfaces of the armatures A and A' are in equal predetermined spaced relationship from said pole faces N and S of the related units M and M'.

The load springs 52 are preferably of considerable strength with respect to the mass of the rod 51 and armatures A and A' and are therefore such that the spring rate of said springs governs the operation of the construction as regards its natural frequency.

The operating rod 10 coupled with and extending rearwardly from the valve member of the valve means V, projects rearwardly from the valve means V and its rear end in the forward end of the axial tube 57 of the forward spring 52 by a means of a spool-like coupling part 60. In practice the rear end of the rod can be threaded in the part 60 and fixed therein, in adjusted axial position, by suitably staking the threads thereof.

With the structure set forth above, it will be apparent that the means V and D are suitably coupled and housed to establish a neat, compact, easy and economical to make, assemble and maintain servo valve construction.

It will be further apparent that with and by means of the axially shiftable threaded coupling means provided between the springs and the shaft, accurate adjustment of the springs and positioning of the armatures and the valve member can be easily and conveniently made.

Each of the armatures A and A' is a cone-shaped body of magnetic material, with a radially outwardly and axially extending wall 80 of predetermined thickness, a central hub-like portion 81 with a central axially extending opening therein and through which the shaft 51 is engaged and suitably fixed. The wall 80 defines an outer peripheral substantial annular surface or edge 82 which is normal to the inclined planes of the wall. The armature A defines and is characterized by a forwardly and radially outwardly disposed conical surface 90 and the armature A' defines and is characterized by a rearwardly and radially outwardly disposed conical surface 91. The armature A extending into the unit M and the surface 90 thereof is complimentary with and opposes the pole faces N and S thereof. The armature A' extends into the unit M' and the surface 91 thereof is complimentary with and opposes the pole faces N and S thereof.

The outer edges or surfaces 82 of the armatures A and A', which edges will have been considered and referred to as being radially outwardly disposed, are provided with outwardly and axially inwardly opening annular grooves 93, opening axially at the sides of the armature walls remote from the surfaces 90 and 91 thereof. The grooves 93 have parabolically curved surfaces which cooperate with their adjacent peripheral edge portions of the armatures to define peripheral edge portions of diminishing cross-section. The edge portions of diminishing cross-section at and about the outer periphery of the surfaces 90 and 91 of the armatures A and A' are so formed that as the portions of the armatures with which they are related are subjected to increased magnetic field forces, the edge portions become saturated from the exterior and substantially radially inwardly at a predetermined rate.

It is to be noted that the units M and M' are spaced axially apart and are such that they are magnetically isolated one from the other.

In operation, the coils or windings W of the means M and M' are normally energized by equal, signal currents and so that the outer circumferential poles N of the units are north and the inner poles S are south. The lines of flux between the poles of the units M and M' are conducted from north to south through the air gaps and through the armature A and A', respectively. The quiescent currents are such that the armature material of both armatures is magnetically biased, that is, they are magnetized to that extent that it will accommodate additional lines of flux freely and without the conducting of added or extra current to the field windings to effect magnetizing of the armatures.

It is important to note that while the armatures A and A' are normally magnetically biased as set forth above, the motive effect on the magnetic fields of the units M and M' thereon is equalized one by the other and the armatures remain in the central, normal position with the surfaces 90 and 91 thereof spaced equal distances from their opposing related pole faces of the units M and M'.

Upon an increase of current to the winding W of one unit, and a decrease of current to winding of the other unit, the normal balance of the fields acting on and through the armatures A and A' are upset and the armatures are urged towards said one unit and away from the other unit.

As the armatures move, as a unit with the shaft, towards said one unit the saturable portion of the armature related to that unit, that is the peripheral portion of diminishing cross-section thereof becomes progressively magnetically saturated in a predetermined ratio between the force of the field of that unit and the diminishing distance between that armature and said one unit, and so that the effect of that field on and through that armature and shaft assembly which is linear with respect to the differential of the input currents.

The armatures A and A' and the units M and M' are designed, balanced and related to each other so that the axial movement of the armatures between the units M and M' is linear with the differential in currents supplied to the units M and M'.

With the drive means D provided, it will be apparent that the means D is energized and in full operating condition at all times and that the mechanical movement to be effected thereby, be it right or left of center, occurs instantly in direct linear response to differentials established in the currents to the field units M and M'.

In FIG. 4, line X indicates the linear displacement of my new armature with respect to differentials in signal current. Line Y indicates the nature of saturation of the armatures A and A' in response to current differentials and displacement of the armatures. Line Z indicates the performance characteristics of the armatures in the instant drive means which are not grooved or provided with the saturable portions here provided.

In the chart shown in FIG. 5 of the drawings, the performance characteristics of one embodiment of my new construction is illustrated. It is to be noted that the differentials in amperes is that differential which is brought about by current added and subtracted to the normal quiescent currents to the units M and M' which quiescent currents can be whatever current is required to effect the desired magnetic biasing of the unit cores and those portions of the armature related thereto.

The provision of conical-faced armatures or plungers A and A' with the complimentary faced electromagnet units M and M', as previously noted, extends the economical range of usefulness of the magnetic device over relatively smaller and larger strokes. This is due to the conical faces which cause the permeance of the working gap to increase less rapidly with motion, and hence decrease the force.

The force distance curve for the instant structure is comparable quantitatively to the force distance curve for flat-faced armatures and magnet units, such as disclosed in my above identified U.S. Pat. No. 3,774,642, in FIG. 6 of the drawings.

It will be apparent that as the angle of the conical surfaces of the armatures becomes more accute with respect to the axis of the shaft, the rate of which the gap increases less rapidly with respect to axial movement of the armatures away from these related units M and M'. However, as the accuteness of the angle of the armatures A and A' is increased, the longitudinal extent of those units and of their related magnet units M and M' is necessarily increased. Accordingly, and so as not to unduly increase the overall longitudinal extent of the motor, it is preferred that the angle of the armature and pole faces be such that the desired or required additional stroke be provided for and that unnecessary stroke capability not be built into the construction. In the drawings, the angle of the subject faces is shown to be at 60° to the axis of the construction. In practice, the subject angles can be established at 45° or 30° as circumstances require.

The structure, configuration and cooperative relationship of each electro magnet unit M or M' with its radially spaced, conical poles and the related conical armature A or A' with its magnetically saturable portion presents a novel idea of means which can, if desired, be embodied or put to advantageous use in other electro magnetic drive means, such as a simple unidirectional pull-type drive means.

Having described only one typical preferred form and application of my invention, I do not wish to be limited or restricted to the specific details herein set forth, but wish to reserve to myself any modifications and/or variations that may appear to those skilled in the art to which this invention pertains.

Having described my invention, I claim:

1. An improved drive means to shift an axially shiftable member forwardly and rearwardly to and from a central normal position comprising an elongate armature shaft with front and rear ends, coupling means connecting the front end of the shaft with the member, a pair of front and rear armatures on the shaft in spaced relationship and defining forwardly and rearwardly, axially and radially outwardly disposed conical surfaces, front and rear electro magnet field units arranged forwardly and rearwardly of the front and rear armatures and having axially and radially inwardly disposed conical north and south poles in normal predetermined spaced and opposing relationship with the conical surfaces of the armatures, resilient support means at the ends of the shaft maintaining the shaft on a common axis and biased to exert equal and opposing forces axially inwardly at the ends of the shaft and normally yieldingly holding the shaft with the armature in its normal position, said field units normally energized by quiescent currents and establishing equal and opposite magnetic fields intersecting the armatures related thereto whereby the armatures are normally magnetized and held in their normal position by the fields, said armatures and shaft being shifted axially toward one field unit upon an increase of current thereto and a decrease of current to the other field unit resulting in increase and decrease in the magnetic fields of the units acting on their related armatures, the armatures having progressively magnetically saturable portions whereby the saturable portion of the armatures saturate progressively upon linear longitudinal movement toward their related field units and in response to linear differentials in the currents to the field units.

2. A structure as set forth in claim 1 wherein the field units include elongate axially aligned, axially spaced cylindrical cores with central openings through which opposite end portions of the shaft freely project axially and radially inwardly disposed ends, annular, conical axially inwardly opening grooves opening at said inner ends and defining axially and radially inwardly disposed radially spaced annular pole faces and field coils engaged in the grooves, said armatures being radially and axially inwardly extending cone-shaped parts on the portion of shaft in axial spaced relationships extending freely between the inner ends of the field units and having outer substantially cylindrical sides with radially outwardly and axially inwardly opening shaped channel defining said magnetically saturable portions related to the axially outwardly disposed conical surfaces thereof, and means engaged with and between the cores to maintain the units in fixed relationship with each other.

3. A structure as set forth in claim 2 wherein said yielding support means for the shaft includes axially yielding radially non-yielding spring units mounted in fixed spaced position from axially outwardly disposed ends of the field units and means connecting each spring unit with an end portion of the shaft.

4. A structure as set forth in claim 3 wherein the field units include elongate axially aligned, axially spaced cylindrical cores with central openings through which the shaft freely projects, axially and radially inwardly disposed inner conical ends, annular, axially inwardly opening grooves opening at said inner ends and defining axially and radially inwardly disposed radially spaced annular pole faces and field coils engaged in the grooves, said armatures being axially spaced, axially and radially extending cone-shaped part on the shaft extending freely between the inner ends of the field units and each having an outer substantially cylindrical side with a radially outwardly and axially inwardly opening shaped channel defining said magnetically saturable portions thereof, and means engaged with and between the cores to maintain the units in fixed relationship with each other and including an elongate barrel with open ends and in which the cores are engaged and held, said barrel having mounting means thereon to engage a related support structure.

5. A structure as set forth in claim 1 wherein said yielding support means for the shaft includes axially yielding radially non-yielding spring units mounted in fixed spaced position from axially outwardly disposed ends of the field units and means connecting each spring unit with an end of the shaft.

* * * * *